(12) United States Patent
Tseng et al.

(10) Patent No.: US 6,876,545 B2
(45) Date of Patent: Apr. 5, 2005

(54) FLAT PANEL DISPLAY APPARATUS AND TILT/SWIVEL MECHANISM THEREIN

(75) Inventors: Peter Tseng, Taipei (TW); Chu-Hsian Chian, Taipei (TW); Hsu Shih Chung, Taipei (TW); John Yeh, Taipei (TW); Sheng-Nan Lu, Taipei (TW)

(73) Assignee: Acer Inc., Taipei Hsien (TW)

( * ) Notice: Subject to any disclaimer, the term of this patent is extended or adjusted under 35 U.S.C. 154(b) by 0 days.

(21) Appl. No.: 10/422,814

(22) Filed: Apr. 25, 2003

(65) Prior Publication Data

US 2004/0008477 A1 Jan. 15, 2004

Related U.S. Application Data (63) Continuation of application No. 09/858,520, filed on May 17, 2001, now Pat. No. 6,587,333.

(30) Foreign Application Priority Data

Feb. 9, 2001 (TW) ...................................... 90202022 U (51) Int. Cl.[7] .............................................. G06F 1/16
(52) U.S. Cl. ..................... 361/681; 361/683; 312/7.2; 248/919; 248/921; 403/53; 16/366
(58) Field of Search ................................ 361/680–686; 16/340, 342, 366, 367; 248/917–924; D14/315, 316, 371–382; 403/53, 57

(56) References Cited

U.S. PATENT DOCUMENTS

| | | | |
|---|---|---|---|
| 4,640,485 A | * 2/1987 | Day et al. | 248/921 |
| 4,757,388 A | 7/1988 | Someya et al. | 358/224 |
| 4,919,387 A | * 4/1990 | Sampson | 248/371 |
| 4,986,507 A | 1/1991 | Chiang | 248/291 |
| 5,206,790 A | * 4/1993 | Thomas et al. | 361/681 |
| 5,335,142 A | * 8/1994 | Anderson | 361/681 |
| 5,539,463 A | 7/1996 | Morikawa et al. | 348/375 |
| 5,724,704 A | 3/1998 | Seo | 16/254 |
| 5,739,859 A | 4/1998 | Hattori et al. | 348/375 |
| 5,947,440 A | * 9/1999 | Cho | 361/681 |
| 6,189,842 B1 | * 2/2001 | Bergeron Gull et al. | 248/919 |
| 6,268,997 B1 | * 7/2001 | Hong | 361/681 |
| 6,347,433 B1 | * 2/2002 | Novin et al. | 16/367 |
| 6,522,530 B2 | * 2/2003 | Bang | 361/681 |

FOREIGN PATENT DOCUMENTS

| | | |
|---|---|---|
| CN | 1155112 A | 7/1997 |
| CN | 2352086 Y | 12/1999 |
| CN | 2411511 Y | 12/2000 |
| CN | 2419639 Y | 2/2001 |

OTHER PUBLICATIONS

Opposition No. 09240300060 Dated Feb. 25, 2003 with Attachments Copy of Chinese Search Report.
English Language Abstracts of Chinese Patent Appln. Nos. 2411511Y, 2352986Y, 1155112A and 2419639Y.

* cited by examiner

Primary Examiner—Lisa Lea-Edmonds
(74) Attorney, Agent, or Firm—Michael Bednarek; Shaw Pittman LLP (57) ABSTRACT

A flat panel display apparatus having a tilt/swivel mechanism therein allows a user to adjustably move the display panel in an up-and-down tilt direction and a right-and-left swivel direction along the connecting area. The flat panel display apparatus includes: a flat panel display, a computer, a swivel base, a yoke, a mounting base and a pair of elastic members. The yoke is pivotally secured to the connecting area of the flat panel display. The swivel base is pivotally secured to the flat panel display with the yoke. The swivel base has a first cylinder with two grooves parallel and opposite each other on the outer surface of the first cylinder. The mounting base is located in the computer. The mounting base has a second cylinder, the second cylinder having a cable hole formed at the center of the second cylinder to hold the swivel base and two mounting slots located in the cable hole opposite each other. Each elastic member has a projection to be held in the mounting slot. Each groove holds the projection and stops the swivel action while the swivel base swivels to a particular orientation in the mounting base.

16 Claims, 8 Drawing Sheets

FLAT PANEL DISPLAY APPARATUS AND TILT/SWIVEL MECHANISM THEREIN

This application is a continuation of U.S. patent application Ser. No. 09/858,520, filed May 17, 2001 now U.S. Pat. No. 6,587,333.

REFERENCE TO RELATED APPLICATIONS

This application claims the benefit of priority under 35 U.S.C. §119(a) of Taiwan Patent Application No. 090202022, filed Feb. 9, 2001.

BACKGROUND OF THE INVENTION

1. Field of the Invention

The present invention relates to a flat panel display apparatus and a tilt/swivel mechanism therein, and more particularly, to a flat panel display apparatus with a tilt/swivel mechanism which allows a user to adjustably move the display panel in an up-and-down tilt direction and a right-and-left swivel direction along the connecting area.

2. Description of the Related Art

Traditional flat panel display apparatus with a tilt/swivel mechanism has a complicated structure and limited swivel angle up to 60 degrees. Due to the limitation of swivel angle, users are allowed to adjust the swivel angle of the flat panel display on a limited scale.

SUMMARY OF THE INVENTION

To solve the above problem, it is an object of the present invention to provide a tilt/swivel mechanism not only permitting a user to adjustably move the display panel in an up-and-down tilt direction, but also in a right-and-left swivel direction along the connecting area.

In accordance with the present invention, a flat panel display apparatus and a tilt/swivel mechanism therein, two preferred embodiment are shown in the following description.

The first preferred embodiment includes: a flat panel display, a computer, a swivel base, a yoke, a mounting base and two elastic members. The yoke is connected to an edge of the flat panel display. The swivel base is pivotally secured to the edge of the flat panel display with the yoke and has a first cylinder with two grooves parallel and opposite each other on the outer surface of the first cylinder. The mounting base is located on the computer and has a second cylinder having a cable hole formed at the center of the second cylinder to hold the mounting base and two mounting slots located in the cable hole opposite each other. Each of the elastic members has a projection to be held in the mounting slot. Each groove holds the projection and stops the swivel action while the swivel base swivels to a particular orientation in the mounting base.

While the swivel action stop by the engagement of the projection and the groove, the flat panel display faces upward and tilts forwards to be in a closed position with the computer. When the flat panel display is in a facing upward and closed position with the computer, screen of the flat panel display faces upwards and can be used as an electronic book.

The second flat panel display apparatus includes: a flat panel display, a computer, a mounting member, a yoke, a swivel base and two elastic members. The mounting member is located on the computer and has a first cylinder with two grooves parallel and opposite each other on the outer surface of the first cylinder. The yoke is connected to an edge of the flat panel display. The swivel base is pivotally secured to the edge of the flat panel display with the yoke. The swivel base has a second cylinder. The second cylinder has a cable hole formed at the center of the second cylinder to hold the mounting member and two mounting slots located in the cable hole opposite each other. Each elastic member has a projection to be held in the mounting slot. Each groove holds the projection and stops the swivel action while the swivel base swivels to a particular orientation in the mounting member.

While the swivel action is stopped by the engagement of the projection and the groove, the flat panel display faces upward and tilts forwards to be in a closed position with the computer.

In the above embodiment, swivel action requires a torsion that is provided by the friction between the projection of the elastic member and the surface of the swivel base. The elastic member is a metal spring plate. When swivel base swivels to a particular orientation, for example a swivel angle of 180 degrees in the mounting member, each groove holds the projection and positions the swivel base at a swivel angle of 180 degrees. In other words, the flat panel display then is positioned at swivel angle of 180 degrees either counterclockwise or clockwise. It follows that back instead of the front, the display screen, of the flat panel display apparatus faces the user. The flat panel display then is tilted forward with the yoke to be in a closed position with the computer. When the flat panel display is in a facing upward and closed position with the computer, screen of the flat panel display faces upwards and is used as an electronic book.

The other objective of the present invention is to provide a tilt/swivel mechanism. It provides a wider swivel angle for the flat panel display. In addition, when swivel base is stopped at a swivel angle as 180 degrees, the flat panel display faces upward and tilts forwards to be in a closed position with the computer. When the flat panel display is in a facing upward and closed position with the computer, screen of the flat panel display faces upwards and can be used as an electronic book.

To avoid the signal cable which goes through the cable hole between the flat panel display and the computer may be damaged due to frequent swivel actions, in the preferred embodiment according to the present invention, a coaxial cable is recommended to be the signal cable between the flat panel display and the computer.

BRIEF DESCRIPTION OF DRAWINGS

The following detailed description, given by way of an example and not intended to limit the invention to the embodiments described herein, will best be understood in conjunction with the accompanying drawings, in which.

DETAILED DESCRIPTION OF THE INVENTION

Two preferred embodiments of the present invention—flat panel display apparatus and tilt/swivel mechanism therein—are described below.

First Embodiment

Figure 1A:
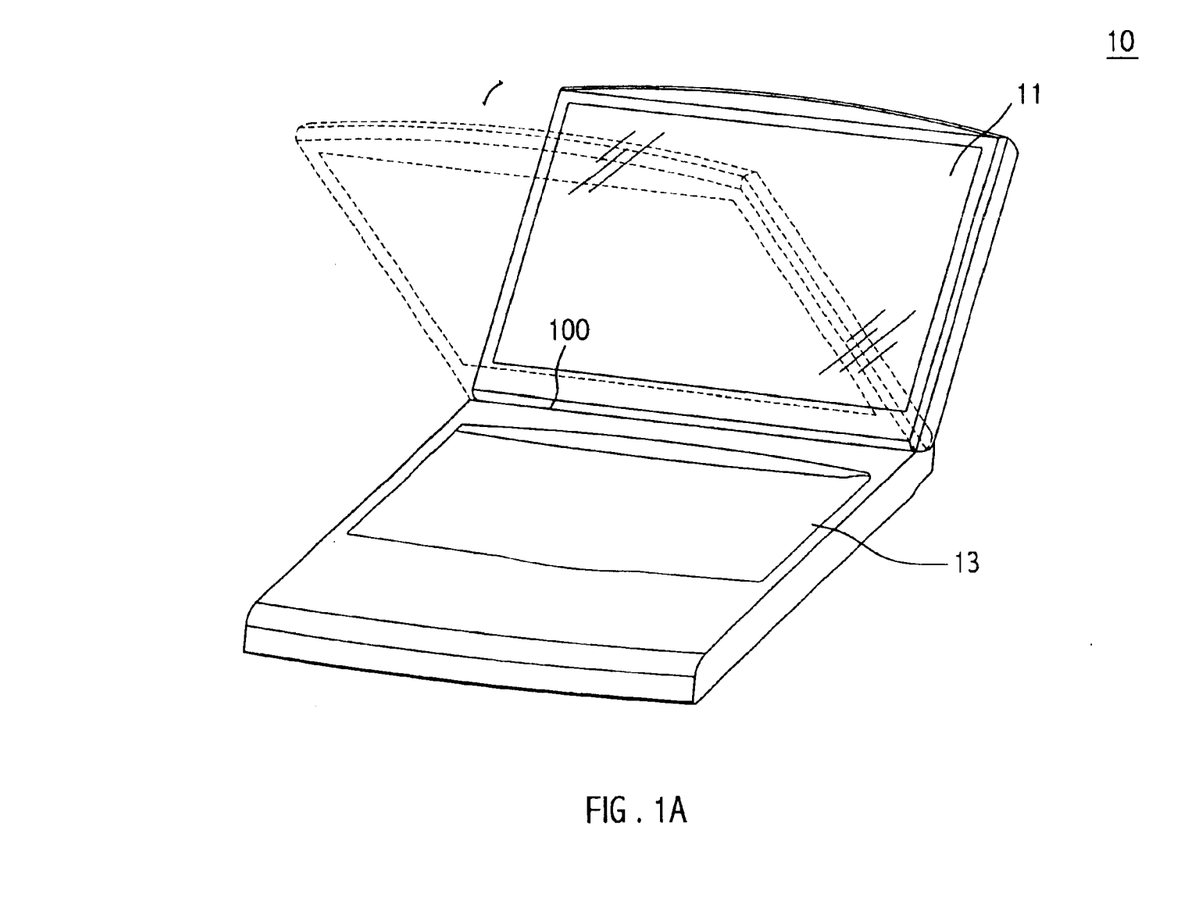
FIG. 1(a), FIG. 1(b), FIG. 1(c) and FIG. 1(d) are perspective views showing the operation according to the invention.

FIG. 1(a) to FIG. 1(d) are perspective views showing the operation according to the invention. FIG. 1(a) is a flat panel display apparatus 10 comprising a flat panel display 11, a computer13 and a tilt/swivel mechanism 12 (refer to FIG. 2) hidden between flat panel display 11 and computer 13. The tilt/swivel mechanism 12 permits a user to adjustably move the display panel in an up-and-down tilt direction along a connecting area 100.

Figure 1B:
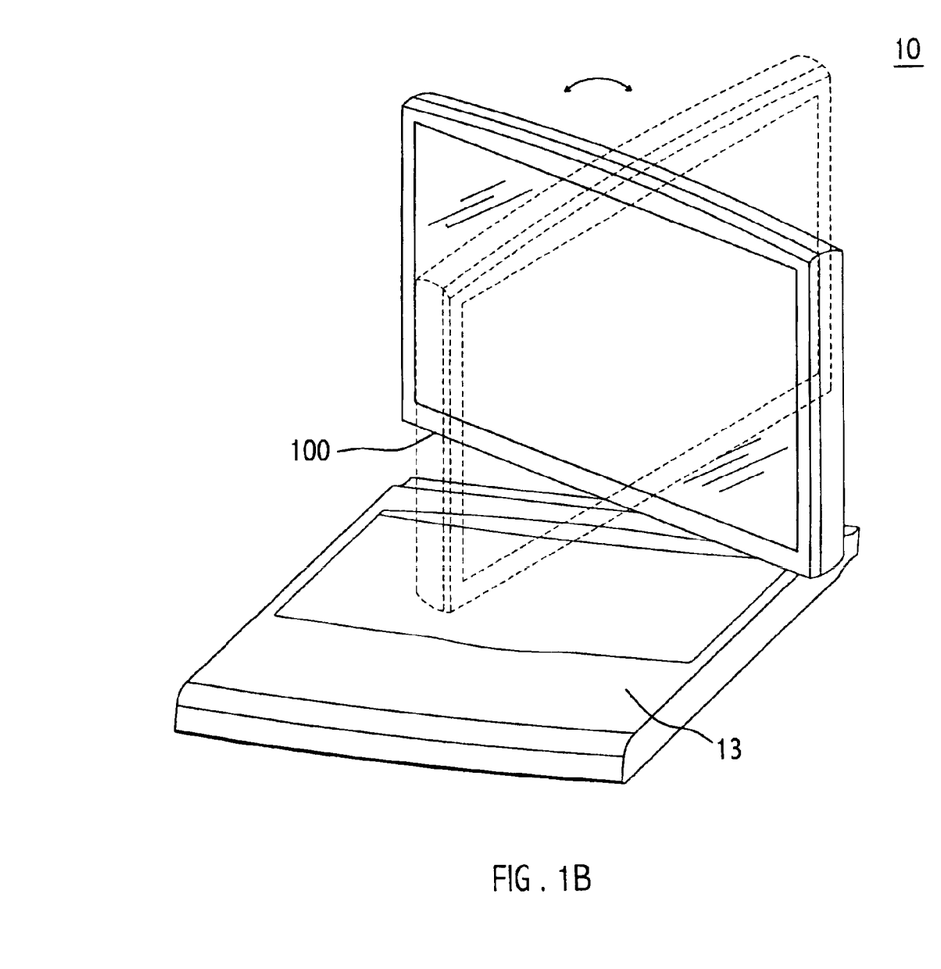

A tilt/swivel mechanism 12 illustrated in the FIG. 1(b) permits a user to adjustably move the display panel in a right-and-left swivel direction along the connecting area 100.

Figure 1C:
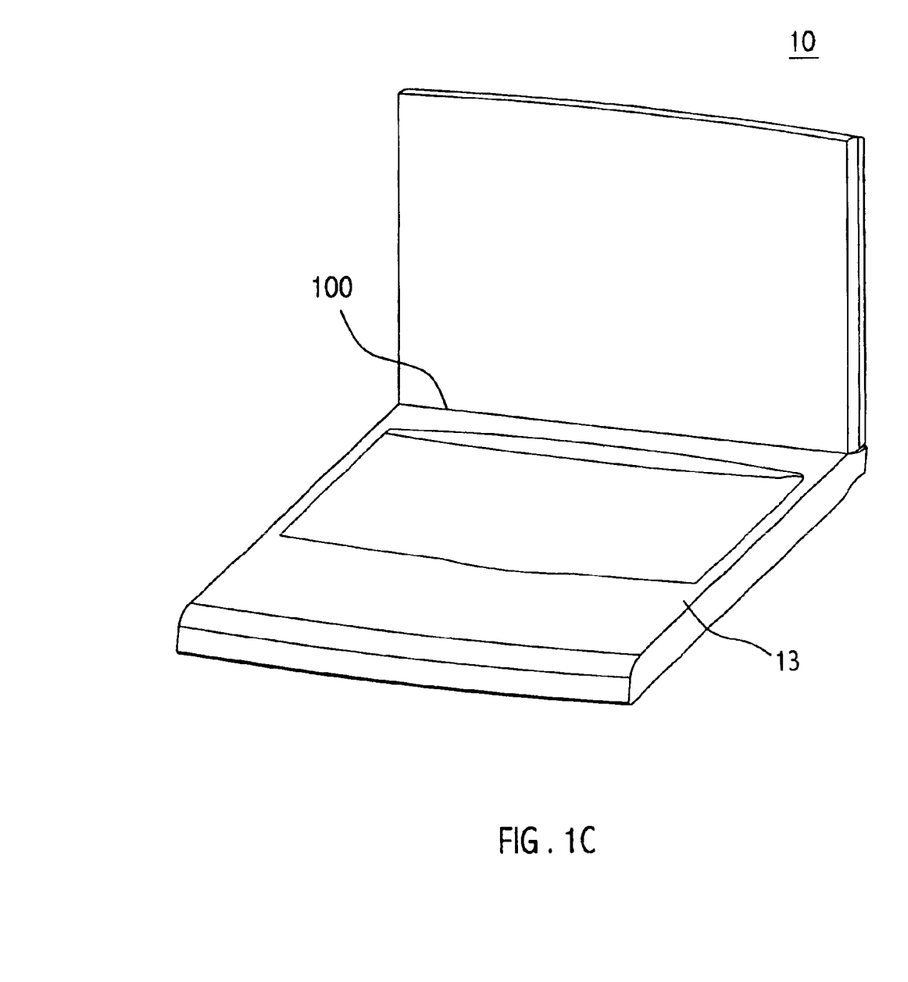
Figure 1D:
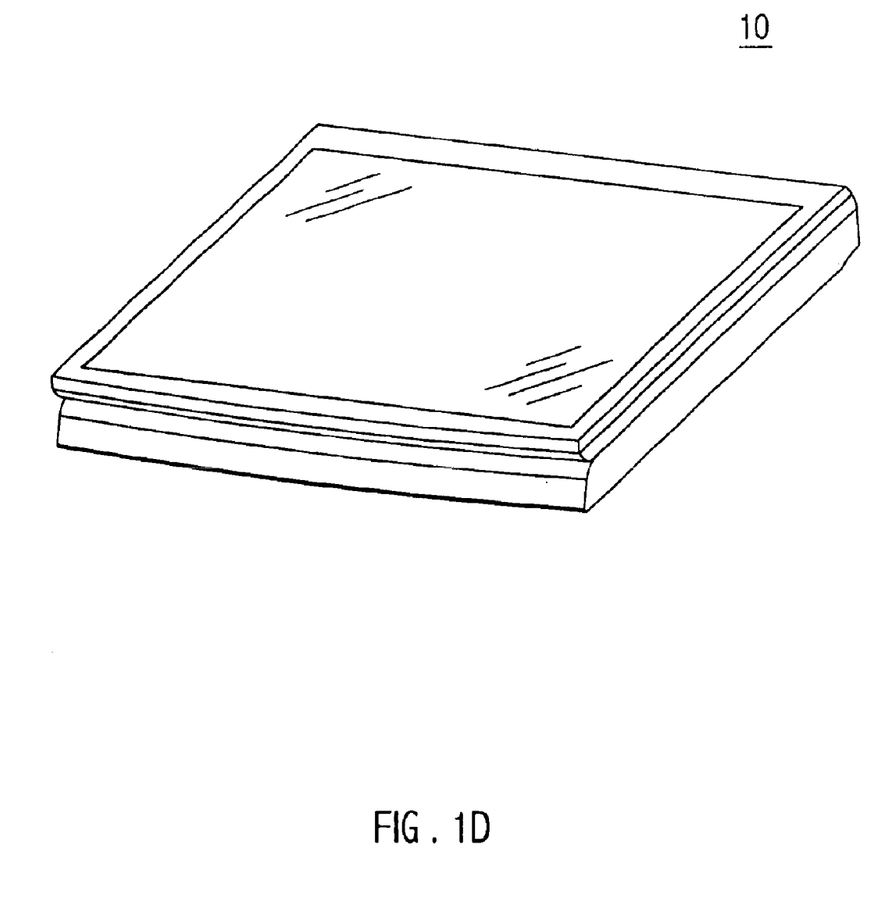

FIG. 1(c) is a perspective view illustrating the condition as the flat panel display 11 swivels to a particular orientation, for example 180 degrees. At this point, the back of the flat panel display 11 faces forward. FIG. 1(d) is the condition followed by the FIG. 1(c), where the flat panel display 11 tilts forward to be in a closed position with the computer 13. The display screen of the flat panel display 11 then faces upwards. The front, the side having the display screen of the flat panel display 11 can further comprises input devices, for example a touch pad to enable the flat panel display 11 served as a electronic book.

Figure 2:
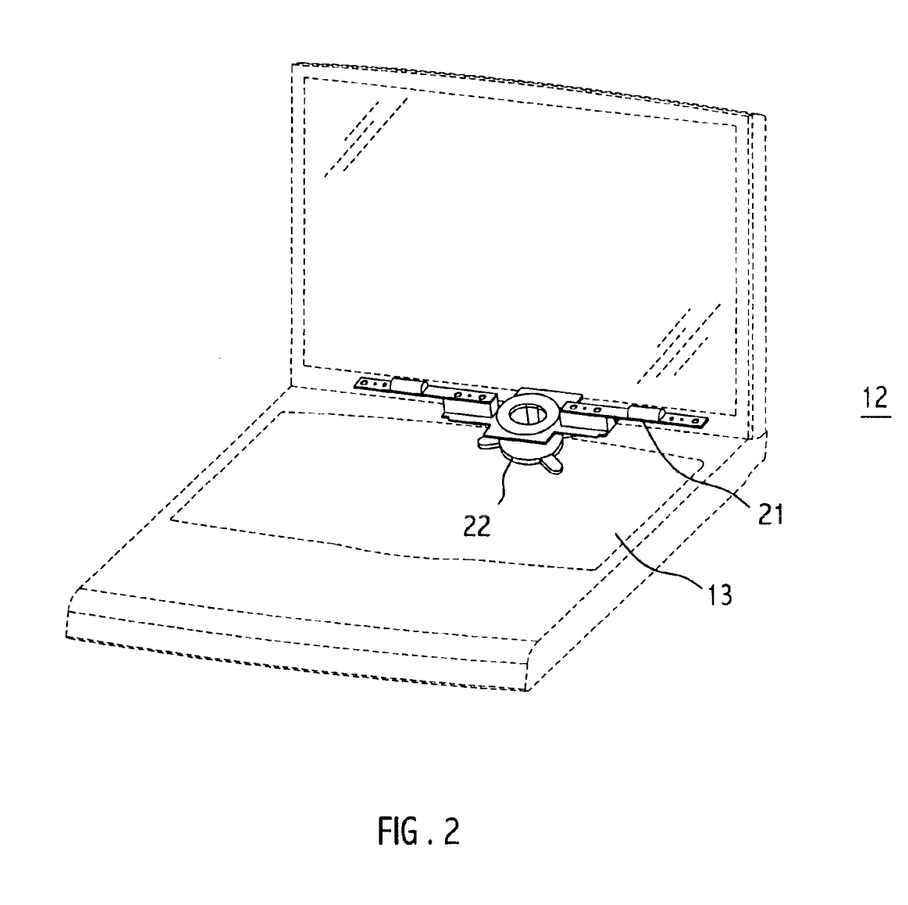
FIG. 2 is a perspective view of the tilt/swivel mechanism of the flat panel display apparatus according to the invention.

FIG. 2 illustrates the tilt/swivel mechanism 12 hidden between the flat panel display 11 and the computer 13 as shown in the FIG. 1(a). The tilt/swivel mechanism 12 comprises a yoke 21 and a swivel hinge 22. The yoke 21 is used for a user to adjustably move the flat panel display 11 in an up-and-down tilt direction along the connecting area. The swivel hinge 22 is used for a user to adjustably move the flat panel display 11 in a right-and-left swivel direction along the connecting area.

Figure 3:
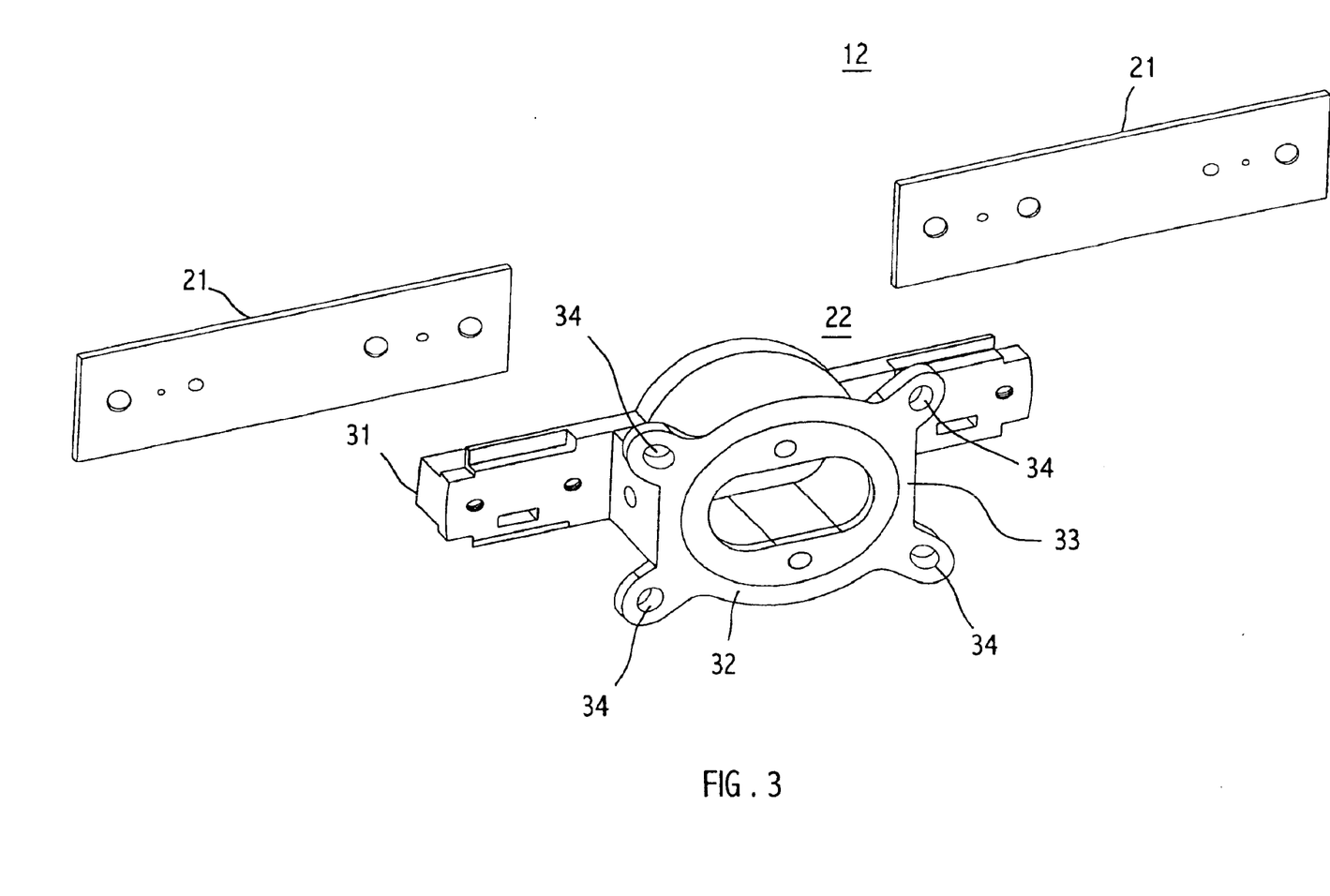
FIG. 3 is an enlarged perspective view of the tilt/swivel mechanism of the flat panel display apparatus according to the invention.

FIG. 3 is an enlarged perspective view of the yoke 21 and the swivel hinge 22. The swivel hinge 22 comprises a yoke mounting arm 31, swivel base32 and a mounting base 33. The yoke mounting arm 31 is utilized to connect to the yoke21. The swivel base 32 is located in the bottom edge of the yoke mounting arm 31. The mounting base 33 is secured on the computer 13 via mounting holes 34. The mounting base 33 holds the swivel base 32 to allow the swivel base 32 swivels therein. As a result, the swivel base 32 connected to the yoke mounting arm 31 swivels when the yoke mounting arm 31 swivels.

Figure 4:
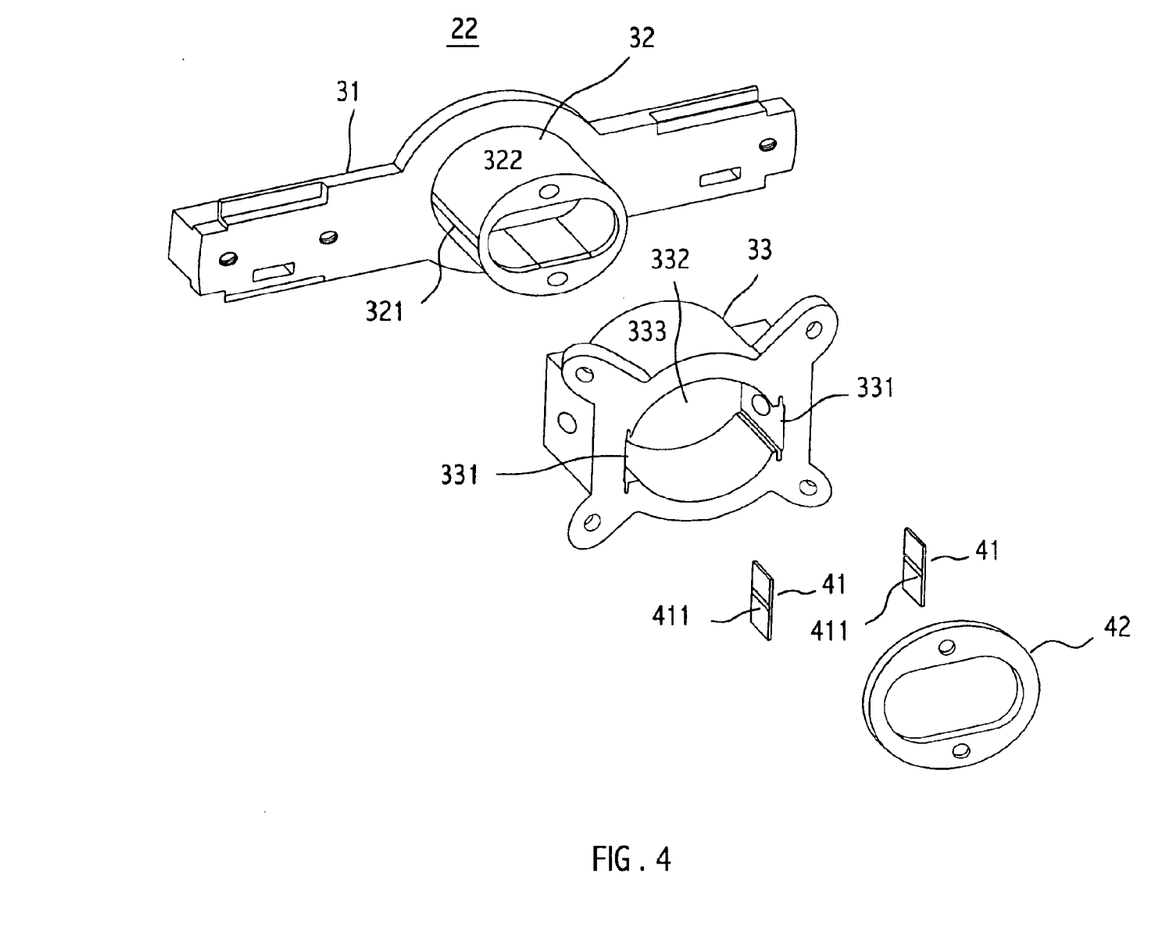
FIG. 4 is an exploded perspective view of the tilt/swivel mechanism of the flat panel display apparatus according to the invention.

FIG. 4 is an exploded perspective view of the swivel hinge 22; comprising the yoke mounting arm 31, the swivel base 32 and the mounting base 33. The swivel base 32 has a first cylinder 322, where two grooves 321 parallel and opposite each other on the outer surface of the first cylinder 322. The mounting base 33 is secured on the computer 13. The mounting base 33 has a second cylinder 333 having a cable hole 332 formed at the center of the second cylinder 333 to hold the swivel base 32. Two mounting slots 331 are located in the cable hole 332 opposite each other. The elastic member 41 comprises a projection 411 to be held in the mounting slots 331. A ring 42 is utilized to cover the mounting base 33 and secured to the swivel base 32 to avoid the elastic member 41 escape from the mounting slot 331. As the swivel base 32 swivels in the mounting base 33 to a particular orientation, each groove 321 holds the projection 411.

Swivel action as mentioned above requires torsion that is provided by friction between the projection 411 of the elastic member 41 and the surface of the swivel base 32. When swivel base 32 swivels to a particular orientation in the mounting base 33, for example a swivel angle as 180 degrees in the mounting base 33, each groove 321 holds the projection 411 and positions the swivel base 32 at a swivel angle of 180 degrees.

In other words, the flat panel display 11 then is positioned at swivel angle of 180 degrees either counterclockwise or clockwise. It follows that back instead of the front, the display screen, of the flat panel display 11 faces the user. The flat panel display then is tilted forward with the yoke 21 to be in a closed position with the computer 13. When the flat panel display 11 is in a facing upward and closed position with the computer 13, screen of the flat panel display 11 faces upwards.

An application of said embodiment is an electronic book.

Alternative Preferred Embodiment

Figure 5:
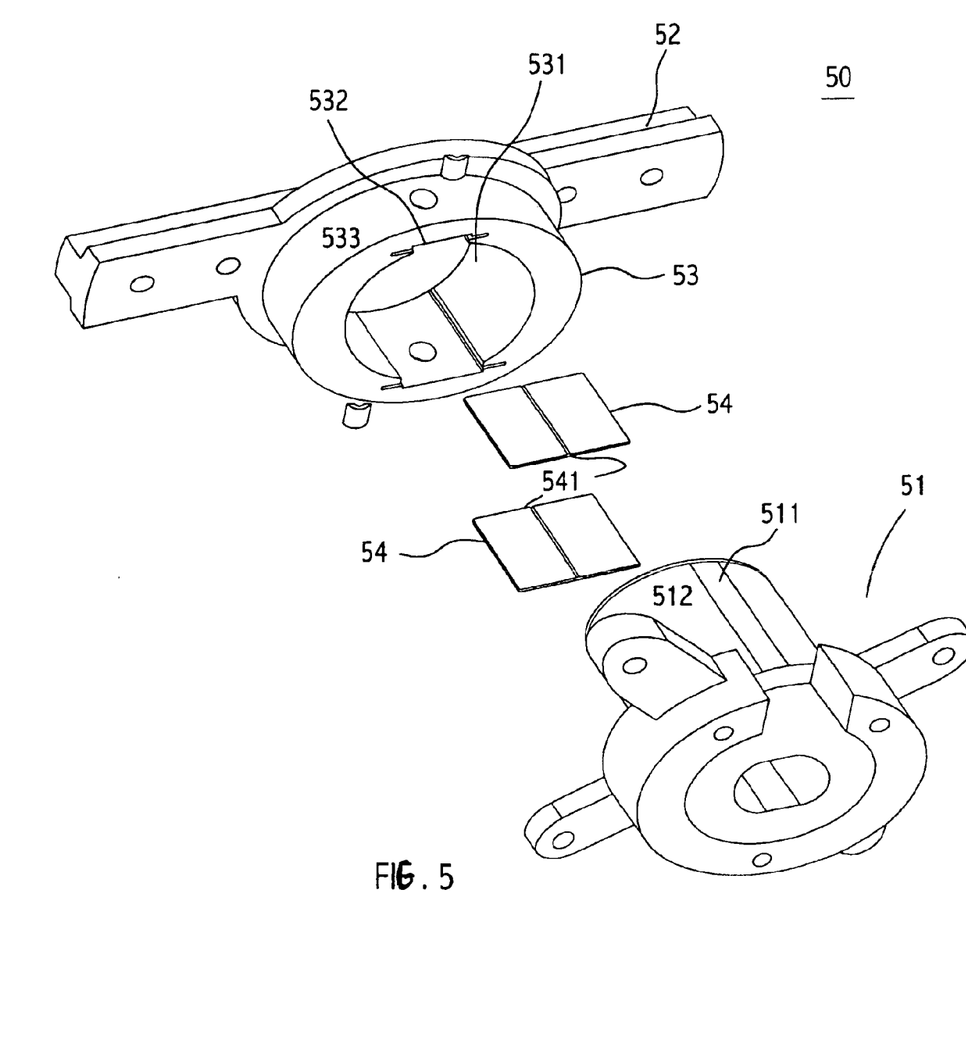
FIG. 5 is an exploded perspective view of the tilt/swivel mechanism of the flat panel display apparatus according to second preferred embodiment of the invention.

FIG. 5 is an exploded perspective view of the tilt/swivel mechanism of the flat panel display apparatus according to second preferred embodiment of the invention. As shown in FIG. 5, a swivel hinge 50 comprises a mounting member 51, a yoke mounting arm 52 and a swivel base 53. The mounting member 51 is located on the computer and has a first cylinder with two grooves parallel and opposite each other on the outer surface of the first cylinder. The yoke mounting arm 52 is utilized for connecting the yoke 21 to the connecting area 100 of the flat panel display 11. The swivel base 53 is located in the bottom edge of the yoke mounting arm 52. In other words, swivel base 53 is pivotally secured to the flat panel display 11 via yoke 21. The swivel base 53 has a second cylinder 533. The second cylinder 533 has a cable hole 531 formed at the center of the second cylinder 533 to hold the mounting member 51, and two mounting slots 532 located in the cable hole 531 opposite each other. Each of the elastic members 54 has a projection 541 to be held in the mounting slots 532. Each groove 511 holds the projection 541 and stops the swivel action while the swivel base 53 swivels to a particular orientation in the mounting member 511.

Swivel action as mentioned above requires torsion that is provided by friction between the projection 541 of the elastic member 54 and the surface of the swivel base 53. When swivel base 53 swivels to a particular orientation in the mounting member 511, for example a swivel angle as 180 degrees in the mounting member, each groove 321 holds the projection 541 and positions the swivel base 53 at a swivel angle of 180 degrees.

In other words, the flat panel display 11 then is positioned at swivel angle of 180 degrees either counterclockwise or clockwise. It follows that back instead of the front, the display screen, of the flat panel display 11 faces the user. The flat panel display then is tilted forward with the yoke 21 to be in a closed position with the computer 13. When the flat panel display 11 is in a facing upward and closed position with the computer 13, screen of the flat panel display 11 faces upwards.

An application of said embodiment is an electronic book.

While the invention has been described with reference to various illustrative embodiments, the description herein should not be construed in a limiting sense. Various modifications of the illustrative embodiments, as well as other embodiments of the invention, will be apparent to those skilled in the art upon reference to this description. It is therefore contemplated that the appended claims will cover any such modifications or embodiments as may fall within the scope of the invention defined by the following claims and their equivalents.

What is claimed is:

1. A tilt/swivel mechanism located at a computer and pivotally secured to a flat panel display with a yoke for permitting a user to adjustably move the display panel in an up-and-down tilt direction and a right-and-left swivel direction along the connecting area, said tilt/swivel mechanism comprising:

a swivel base having a cylinder and connected to the yoke; and a mounting base located in a computer, the mounting base having a pillar, the pillar having a hole formed at the center of the pillar to hold the swivel base while permitting the swivel base to swivel in the mounting base in the clockwise or counter clock wise direction.

2. The tilt/swivel mechanism of claim 1, wherein the pillar further comprises two mounting slots located in the hole opposite each other.

3. The tilt/swivel mechanism of claim 2, wherein the mounting slots hold elastic members with a projection.

4. The tilt/swivel mechanism of claim 3, wherein the cylinder has two grooves parallel and opposite each other on the outer surface of the cylinder and each wherein each groove holds the projection and stops the swivel action while the swivel base swivels to a particular orientation in the mounting base.

5. A tilt/swivel mechanism located at a computer and pivotally secured to a flat panel display with a yoke for permitting a user to adjustably move the display panel in an up-and-down tilt direction and a right-and-left swivel direction along the connecting area, said tilt/swivel mechanism comprising:

a mounting member having a cylinder and connected to the computer;

a swivel base connected to the yoke, the swivel base having a pillar, the pillar having a hole formed at the center of the pillar to hold the mounting member while permitting the swivel base to swivel in the mounting member in the clockwise or counter clock wise direction.

6. The tilt/swivel mechanism of claim 5, wherein the pillar further comprises two mounting slots located in the hole opposite each other.

7. The tilt/swivel mechanism of claim 6, wherein the mounting slots hold elastic members with a projection.

8. The flat panel display apparatus with tilt/swivel mechanism of claim 7, wherein the cylinder has two grooves parallel and opposite each other on the outer surface of the cylinder and each wherein each groove holds the projection and stops the swivel action while the swivel base swivels to a particular orientation in the mounting base.

9. A flat panel display apparatus, comprising:

a flat panel display;

a computer;

a yoke connected to a edge of the flat panel display;

a swivel base having a cylinder and pivotally secured to the edge of the flat panel display with the yoke; and a mounting base located in a computer, the mounting base having a pillar, the pillar having a hole formed at the center of the pillar to hold the swivel base while permitting the swivel base to swivel in the mounting base in the clockwise or counter clock wise direction.

10. The flat panel display apparatus of claim 9, wherein the pillar further comprises two mounting slots located in the hole opposite each other.

11. The flat panel display apparatus of claim 10, wherein the mounting slots hold elastic members with a projection.

12. The flat panel display apparatus of claim 11, wherein the cylinder has two grooves parallel and opposite each other on the outer surface of the cylinder and each groove holds the projection and stops the swivel action while the swivel base swivels to a particular orientation mounting base.

13. A flat panel display apparatus, comprising:

a flat panel display;

a computer;

a yoke connected to a edge of the flat panel display;

a mounting member having a cylinder and located on the computer;

a swivel base pivotally secured to the edge of the flat panel display with the yoke, the swivel base having a pillar, the pillar having a hole formed at the center of the pillar to hold the mounting member while permitting the mounting member to swivel in the swivel base in the clockwise or counter clock wise direction.

14. The flat panel display apparatus of claim 13, wherein the pillar further comprises two mounting slots located in the hole opposite each other.

15. The flat panel display apparatus of claim 14, wherein the mounting slots hold elastic members with a projection.

16. The flat panel display apparatus of claim 15, wherein the cylinder has two grooves parallel and opposite each other on the outer surface of the cylinder and each wherein each groove holds the projection and stops the swivel action while the swivel base swivels to a particular orientation in the mounting base.

* * * * *

UNITED STATES PATENT AND TRADEMARK OFFICE
CERTIFICATE OF CORRECTION

PATENT NO. : 6,876,545 B2 Page 1 of 1
APPLICATION NO. : 10/422814
DATED : April 5, 2005
INVENTOR(S) : Peter Tseng et al.

It is certified that error appears in the above-identified patent and that said Letters Patent is hereby corrected as shown below:

On the title page of the patent, Item (73) Assignee - include --Wistron Corporation, Taipei Hsien, (TW) -- as an additional Assignee.

Signed and Sealed this

Ninth Day of January, 2007

JON W. DUDAS
*Director of the United States Patent and Trademark Office*

UNITED STATES PATENT AND TRADEMARK OFFICE
Certificate

Patent No. 6,876,545 B2                                                                                          Patented: April 5, 2005

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Peter Tseng, Taipei (TW); Chu-Hsian Chian, Taipei (TW); Hsu Shih Chung, Taipei (TW); John Yeh, Taipei (TW); and Chia-Hui Chen, Taiwan, R. O. C.

Signed and Sealed this Twelfth Day of October 2010.

JAYPRAKASH N. GANGHI
*Supervisory Patent Examiner*
Art Unit 2835
Technology Center 2800

UNITED STATES PATENT AND TRADEMARK OFFICE
Certificate

Patent No. 6,876,545 B2

Patented: April 5, 2005

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Peter Tseng, Taipei (TW); Chu-Hsian Chian, Taipei (TW); Hsu Shih Chung, Taipei (TW); John Yeh, Taipei (TW); and Chia-Hui Chen, Taiwan, R. O. C.

Signed and Sealed this Ninth Day of November 2010.

JAYPRAKASH N. GANDHI
*Supervisory Patent Examiner*
Art Unit 2835
Technology Center 2800